June 28, 1927.  
J. ROBINSON  
1,633,679  
AUTOMATIC TRAIN PIPE COUPLING  
Original Filed Nov. 23, 1920  2 Sheets-Sheet 2

INVENTOR  
Joseph Robinson  
BY Watson, Coit  
Morse & Grindle,  
ATTORNEYS.

Patented June 28, 1927.

UNITED STATES PATENT OFFICE.

JOSEPH ROBINSON, OF NEW YORK, N. Y.

AUTOMATIC TRAIN-PIPE COUPLING.

Application filed November 23, 1920, Serial No. 426,025. Renewed November 12, 1925.

My invention relates to automatic train pipe couplings and has among its objects to provide a novel and improved support for such couplings in which the normal distance between the coupling head and the usual bracket may be varied by moving the head forward or backward relative to the bracket. Another object is to provide an adjustable abutment to engage the rear face of the bracket to limit and to vary the forward movement of the coupling head, which abutment co-operates with the supporting spring and bracket to properly support the head.

Figure 1:
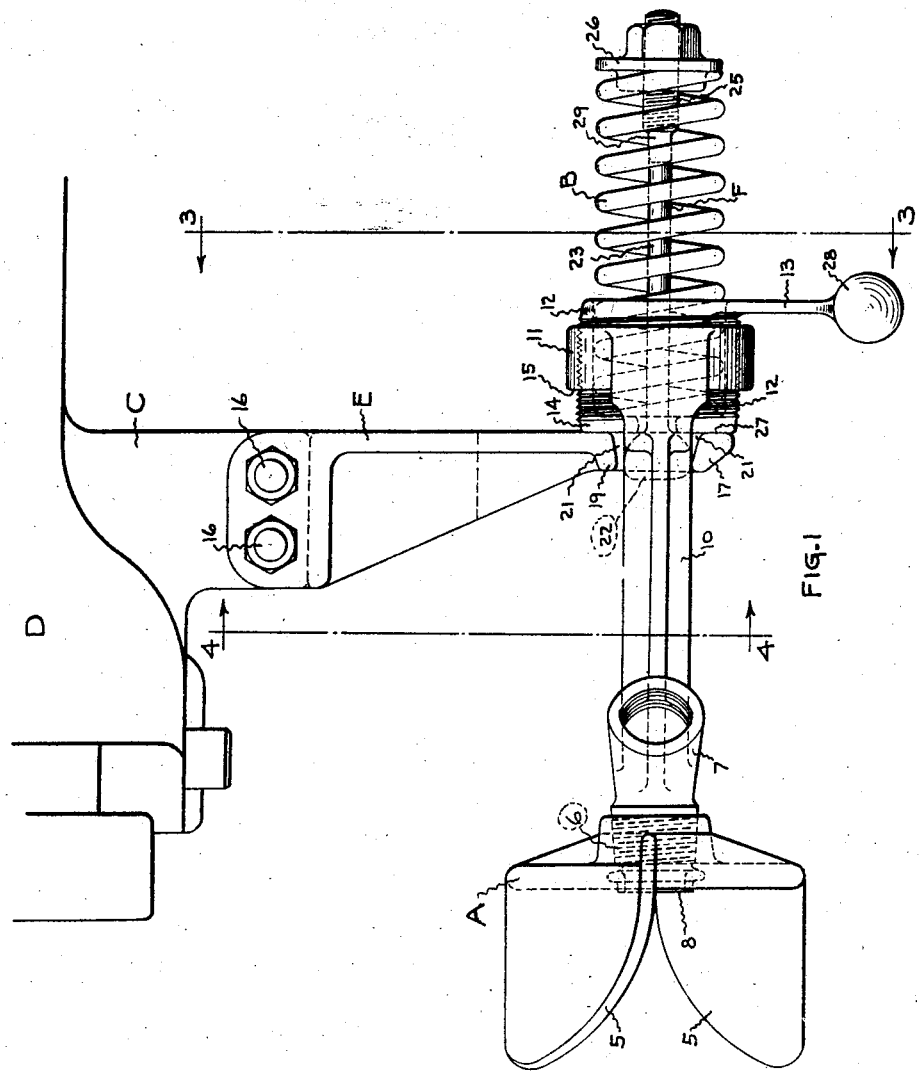

These objects are attained by, and my invention consists in, the combinations, arrangements, and constructions hereinafter described, pointed out in the appended claims, and illustrated in the accompanying drawings in which Figure 1 is a side elevation of my improvement.

Figure 2:
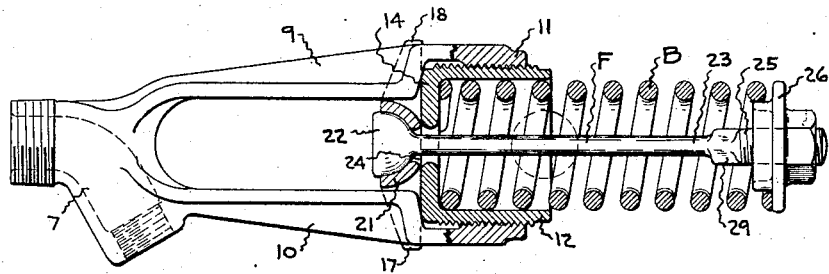

Figure 2 is a sectional plan view thereof with the coupling head omitted.

Figure 3:
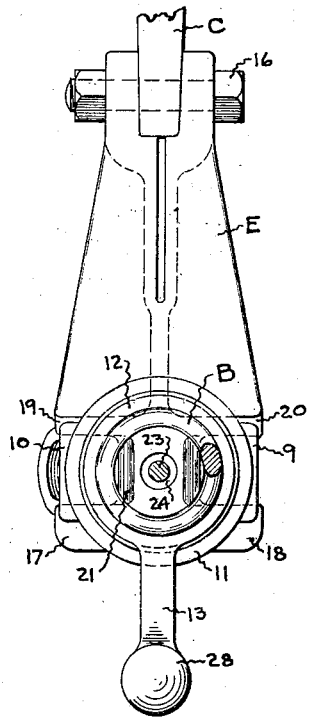
Figure 4:
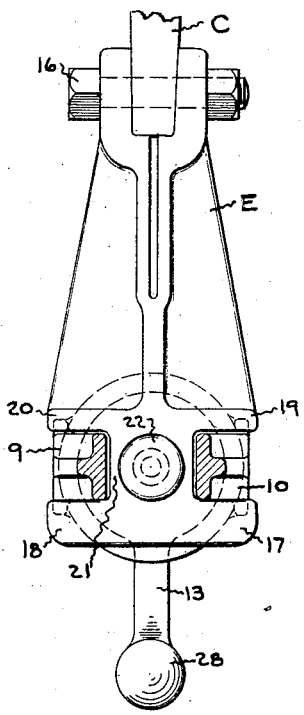

Figure 3 is a rear view of my improvement taken on the line 3—3 of Figure 1, and Figure 4 is a front view of the bracket of my improvement showing the members 9 and 10 as they would appear in section taken on the line 4—4 of Figure 1.

Referring now to the drawings: Any suitable coupling head A may be carried by my improved support. I prefer a head of the type shown, having guiding wings 5, and a centrally disposed port or opening threaded at 6 to receive the curved hollow fitting or conduit 7 of my improvement, and suitably carrying at its forward end, in the plane of the face of the coupling head, a gasket 8. A pair of spaced members or straps 9 and 10 lying preferably in the horizontal plane, terminate at their forward end in the aforesaid fitting or conduit 7, and at their rear end in an interiorly threaded ring or collar 11, though they may, of course, be formed separately of the conduit and the collar if desired. Into the collar 11, I screw a hollow nut or sleeve 12, having a handle or crank 13, and in this nut I mount the forward end of a buffer spring B, as shown particularly in Figure 2. Normally the forward end 14 of the nut 12 rests against the rear face of the bracket E and projects approximately 1″ beyond the inner face 15 of the ring or collar 11 and in the direction of the coupling head A, as shown in Figures 1 and 2.

Suitably connected, as by bolts 16, to the usual lug C of the car coupler D, I provide a bracket or base E the lower end of which, viewed from the front or rear, has the general outline of a capital I, the lower cross of which I forms bearings or trunnions 17 and 18 upon which the members 9 and 10 ride and by which, in co-operation with the portions 19 and 20 of the upper cross of the I, they are positioned relative to and are supported on the bracket E. In this manner the proper positioning of these parts, and of the coupling head A, with respect to the bracket is efficiently effected. Upon the middle section 21 of the I-shaped portion of the bracket, I provide a concave socket, as shown especially in Figure 2, and in this I mount for rocking movement therein, the convex head 22 of a pivot device F.

A shank 23, integral with the convex head 22, extends through the opening 24 in the aforesaid socket, and in the said bracket E, and through the spring B to the rear thereof and is there provided with a threaded portion 25. Upon this threaded portion an abutment or stop 26 is adjustably mounted and serves to maintain the buffer spring B in position with respect to the pivot device F, and to place the spring under compression with the forward end 14 of the nut 12 firmly pressed against the rear face 27 of the bracket E. The pivot device F thus serves to anchor the rear end of the spring B to the bracket E.

The foregoing construction produces an improved support in which the distance between the coupling head A and the bracket E may be readily varied to compensate for the wear occurring on the car coupler knuckles in service, and in which the coupling head is yieldingly supported for universal movement by the buffer spring B and the aforesaid universal joint carried by the bracket E. To vary the distance between the coupling head A and the bracket E, and thus compensate for the wear aforesaid, it is but necessary to rotate the nut 12, through the medium of its handle or crank 13 formed integral with the nut, to the desired extent. This operation will cause the coupling head A to move forward or back according to the direction in which the nut is rotated. The ball 28 on the crank 13 serves to yieldingly maintain the nut 12 in the adjusted position while rotation of the pivot device F, when the stop 26 is being assembled or adjusted along the shank 23, is prevented by embracing the rectangularly shaped portion 29 of the shank with a suitable wrench. The coils of the spring B are, of course, spaced a sufficient distance apart to permit of the ready insertion of this wrench therebetween, and so as to give to the spring the correct and proper design for the purpose intended. An important feature of my improvement lies in the facility with which any desired adjustment of the coupling head A, longitudinally of the bracket E, may be had. In constructions for a like purpose heretofore offered slight adjustment of the head cannot readily be had, whereas with my present improvement adjustments as little as the travel of one of the threads on the nut 12 may be instantly effected. It will be observed also that while the nut 12 is rotatably connected with the spring B, the adjustment mentioned is had without varying the number of coils of the spring that are deflected or constrained when mating coupling head A couple up in service. It is important that all the coils of the spring be available for the function of extending the coupling head forward of the bracket E and placing the joint between mating heads under pressure. This desirable feature is attained in my present improvement.

What I claim is:

1. In an automatic train pipe coupling, the combination of a coupling head and a supporting bracket therefor, of means for extending said head and for varying the distance between the head and said bracket, said means comprising a spring the coils of which are adapted to be deflected or constrained when mating coupling heads couple up in service, and a device engaging one end of said spring and serving to adjust said head forward of the bracket without varying the number of coils of the spring that are deflected or constrained upon coupling of said mating heads, and means for anchoring the other end of said spring to said bracket.

2. In an automatic train pipe coupling, the combination of a coupling head and a supporting bracket therefor, of means for extending said head and for varying the distance between the head and said bracket, said means comprising a spring the coils of which are adapted to be deflected or constrained when mating coupling heads couple up in service, and a device engaging one end of said spring and serving to adjust said head forward of the bracket without varying the number of coils of the spring that are deflected or constrained upon coupling of said mating heads, and means for anchoring the other end of said spring to said bracket, said device being positioned at the rear of said bracket.

3. In an automatic train pipe coupling, the combination of a coupling head and a supporting bracket therefor, of means for extending said head and for varying the distance between the head and said bracket, said means comprising a spring the coils of which are adapted to be deflected or constrained when mating coupling heads couple up in service, and a device serving to adjust said head forward of the bracket without varying the number of coils of the spring that are deflected or constrained upon coupling of said mating heads, said device consisting of a cylindrical member rotatable relative to said spring, one end of said spring being arranged in said cylindrical member and the other end being anchored to said bracket.

4. In an automatic train pipe coupling, the combination of a coupling head and a supporting bracket therefor, of means for extending said head and for varying the distance between the head and said bracket, said means comprising a spring adapted to be compressed when mating coupling heads couple up in service, and a device rotatably connected with one end of said spring and serving to adjust said head forward of the bracket without varying the number of coils of the spring that are compressed upon coupling of said mating heads, the other end of said spring being anchored to said bracket.

5. In an automatic train pipe coupling, the combination with a coupling head and a supporting bracket therefor, of a common non-resilient means for limiting the movement of said coupling head forward of said bracket and for varying the extent of such movement, a coiled spring for projecting said head forward of the bracket, one end of said spring bearing against said limiting means and the other end being anchored to said bracket.

6. In an automatic train pipe coupling, the combination with a coupling head and a supporting bracket therefor, of a spring to project said head forward of said bracket, and screw threaded means engaging one end of said spring for varying the extent of such projection, the other end of said spring being anchored to said bracket.

7. In an automatic train pipe coupling, the combination with a coupling head and a supporting bracket therefor, of a member secured to said head and extending rearwardly past said bracket, a spring arranged at the rear of said bracket for extending said head, one end of said spring being anchored to said bracket, and means for supporting the other end of said spring on said member so as to be adjustable relative thereto, said means including a sleeve within which the last named end of said spring is confined.

8. In an automatic train pipe coupling, the combination with a coupling head and a supporting bracket therefor, of a supporting member secured to said head and extending rearwardly of said bracket, a pivot device connected to said bracket and extending rearwardly thereof, an abutment on said pivot device, a spring for extending said coupling head in front of the bracket, one end of said spring engaging said abutment and the other end being adjustably mounted in said supporting member.

9. In an automatic train pipe coupling, the combination with a coupling head and a supporting bracket therefor, of means for projecting said coupling head forward of said bracket and for varying the extent of such projection, said means comprising a spring, a member extending from said coupling head in the direction of said bracket, and a nut or stop threaded to said member and engaging said spring.

10. In an automatic train pipe coupling, the combination of a coupling head, a bracket, a member extending from said head in the direction of said bracket, a spring between the bracket and said member, and means connected directly to the member for rotary movement relative to the spring to adjust the member along the spring to vary the distance between the coupling head and said bracket, said means being non-adjustable longitudinally relative to the forward end of the spring.

11. In an automatic train pipe coupling, the combination of a coupling head, a bracket, a member extending from said bracket, a pivot device extending rearwardly of the bracket and having an abutment, a sleeve surrounding said pivot device, a spring surrounding said pivot device and having one end bearing against said abutment and the other end arranged in said sleeve, said sleeve being threadedly connected to said member for adjusting the member longitudinally of said spring.

12. In an automatic train pipe coupling, the combination of a coupling head, a bracket, a member extending from said head past said bracket and terminating thereat in a collar, a sleeve screwed into said collar with its forward end abutting said bracket, a spring projecting into said sleeve and adapted to yieldingly sustain said coupling head with said sleeve engaging the rear side of said bracket, and means for adjusting the sleeve along said member to vary the distance between said coupling head and said bracket.

13. In an automatic train pipe coupling, the combination of a coupling head, a supporting bracket having on its side a bearing, a universal joint carried by the lower end of said bracket and adjacent said bearing for permitting universal movement to said coupling head, a member extending from said head past said bracket and riding on said bearing whereby said member and said coupling head are properly positioned relative to said bracket, a sleeve threaded to said member, a spring projecting into said sleeve for extending said head, and means for rotating said sleeve to cause the member to move along the sleeve and thereby vary the distance between said head and said bracket.

14. In an automatic train pipe coupling, the combination of a coupling head, a supporting bracket, a universal joint carried by said bracket for permitting universal movement to said coupling head, said joint comprising a device pivotally mounted on said bracket and extending rearwardly thereof, a plurality of members connected with said head and extending therefrom past said bracket on opposite sides thereof and terminating in a perforated threaded portion, an abutment mounted upon the rear end of said device, a spring projecting into said perforated portion and surrounding said pivot device and bearing upon said abutment, a hollow member screwed into said perforation and surrounding said pivot device and the forward end of said spring and bearing upon said bracket, and means for maintaining said member in position.

15. In an automatic train pipe coupling, the combination of a coupling head, a bracket, a member extending from said head past said bracket and terminating in a perforated threaded portion, a spring projecting into said portion, and means between the spring and said portion and threaded to the latter for adjusting said member longitudinally of the spring to vary the extent of compression of the spring in coupling.

16. In an automatic train pipe coupling, the combination of a coupling head, a bracket, a member extending from said head past said bracket and terminating in a perforated portion, a spring projecting into said portion and adapted to be compressed when mating coupling heads couple up in service, and means between the spring and said portion for adjusting said member longitudinally of the spring without varying the number of coils of the spring that are compressed upon coupling of said mating heads.

17. In an automatic train pipe coupling, the combination with a coupling head and a supporting bracket therefor, of a member secured to said head and extending rearwardly past said bracket, a tie rod pivotally engaging said bracket and extending rearwardly thereof, an abutment on the rear end of said rod, a sleeve carried by the rear end of said member and adjustable relative thereto, a spring surrounding said tie rod, one end of said spring being arranged within said sleeve and the other end bearing against said abutment.

18. In an automatic train pipe coupling, the combination of a coupling head and a bracket therefor, a member supporting said head and extending rearwardly thereof, a coiled spring arranged at the rear of said bracket for extending said head, a tie rod pivotally connected to said bracket and extending rearwardly through said spring, the rear end of said spring being anchored to said bracket, means for supporting the other end of said spring in said member, said last named means being adjustable relative to said member.

In testimony whereof I hereby affix my signature.

JOSEPH ROBINSON.